(12) United States Patent
Platek

(10) Patent No.: US 8,533,051 B2
(45) Date of Patent: Sep. 10, 2013

(54) MULTI-LANGUAGE MULTI-PLATFORM E-COMMERCE MANAGEMENT SYSTEM

(76) Inventor: Nir Platek, Shibuya-ku (JP)

( * ) Notice: Subject to any disclaimer, the term of this patent is extended or adjusted under 35 U.S.C. 154(b) by 147 days.

(21) Appl. No.: 12/913,424

(22) Filed: Oct. 27, 2010

(65) Prior Publication Data

US 2012/0109786 A1    May 3, 2012

(51) Int. Cl.
*G06Q 30/00*    (2012.01)

(52) U.S. Cl.
USPC ..... 705/26.1; 705/26.4; 705/26.44; 705/26.8; 715/773; 704/3; 704/8; 704/9

(58) Field of Classification Search
USPC ........... 705/26.1, 26.4, 26.44, 26.8; 715/773; 704/3, 8, 9
See application file for complete search history.

(56) References Cited

U.S. PATENT DOCUMENTS

| | | | |
|---|---|---|---|
| 6,219,632 | B1 | 4/2001 | Schumacher |
| 6,349,275 | B1 | 2/2002 | Schumacher et al. |
| 6,490,547 | B1 * | 12/2002 | Atkin et al. ........................ 704/8 |
| 6,559,861 | B1 | 5/2003 | Kennelly et al. |
| 7,047,182 | B2 | 5/2006 | Masuichi |
| 7,472,077 | B2 * | 12/2008 | Roseman et al. .......... 705/26.44 |
| 2002/0055835 | A1 | 5/2002 | Carcoba Olivares et al. |
| 2006/0031212 | A1 | 2/2006 | Edelmann et al. |
| 2006/0136309 | A1 * | 6/2006 | Horn et al. ....................... 705/26 |
| 2007/0150370 | A1 | 6/2007 | Staib et al. |
| 2007/0208656 | A1 | 9/2007 | Feaver et al. |
| 2009/0070699 | A1 * | 3/2009 | Birkill et al. ................... 715/772 |
| 2009/0287471 | A1 * | 11/2009 | Bennett ............................ 704/3 |
| 2012/0016656 | A1 * | 1/2012 | Travieso et al. .................. 704/2 |

OTHER PUBLICATIONS

An International Search Report and a Written Opinion both dates May 15, 2012, which issued during the prosecution of Applicant's PCT/IL11/00836.

* cited by examiner

*Primary Examiner* — Yogesh C Garg
(74) *Attorney, Agent, or Firm* — Sughrue Mion, PLLC

(57) ABSTRACT

A computerized system for sale of products having non pre-catalogued parameters in a multi-lingual environment wherein a buyer and a seller communicate in different languages, the system including a non pre-catalogued parameter database, a listing engine operative to prompt in a first language a listing seller to enter multiple non pre-catalogued parameters relating to a product being listed and to store the non pre-catalogued parameters in the non pre-catalogued parameter database and a non pre-catalogued multiple language parameter description engine which is operative to provide human-readable descriptions of the non pre-catalogued parameters in at least one language other than the first language.

3 Claims, 7 Drawing Sheets

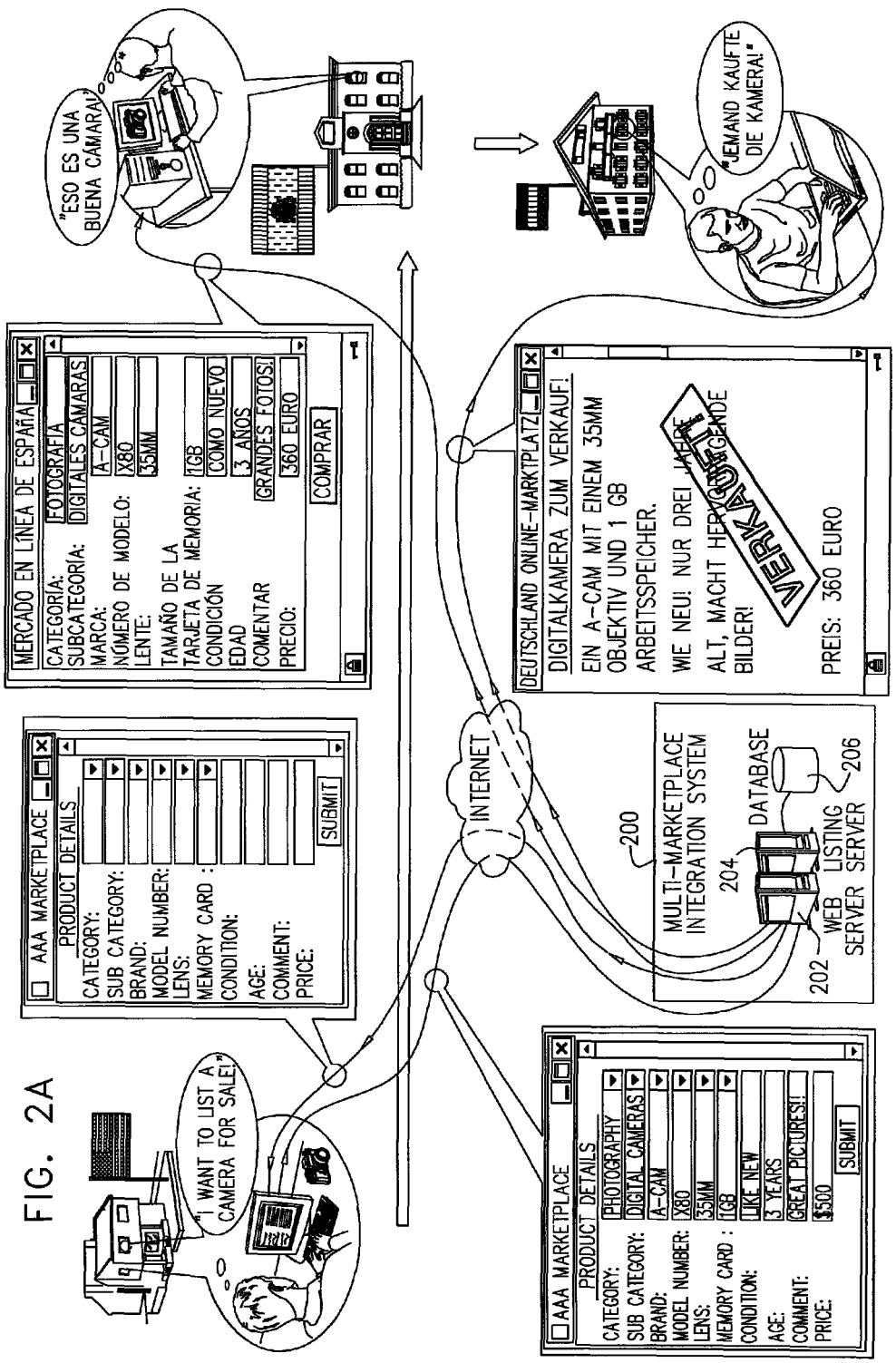

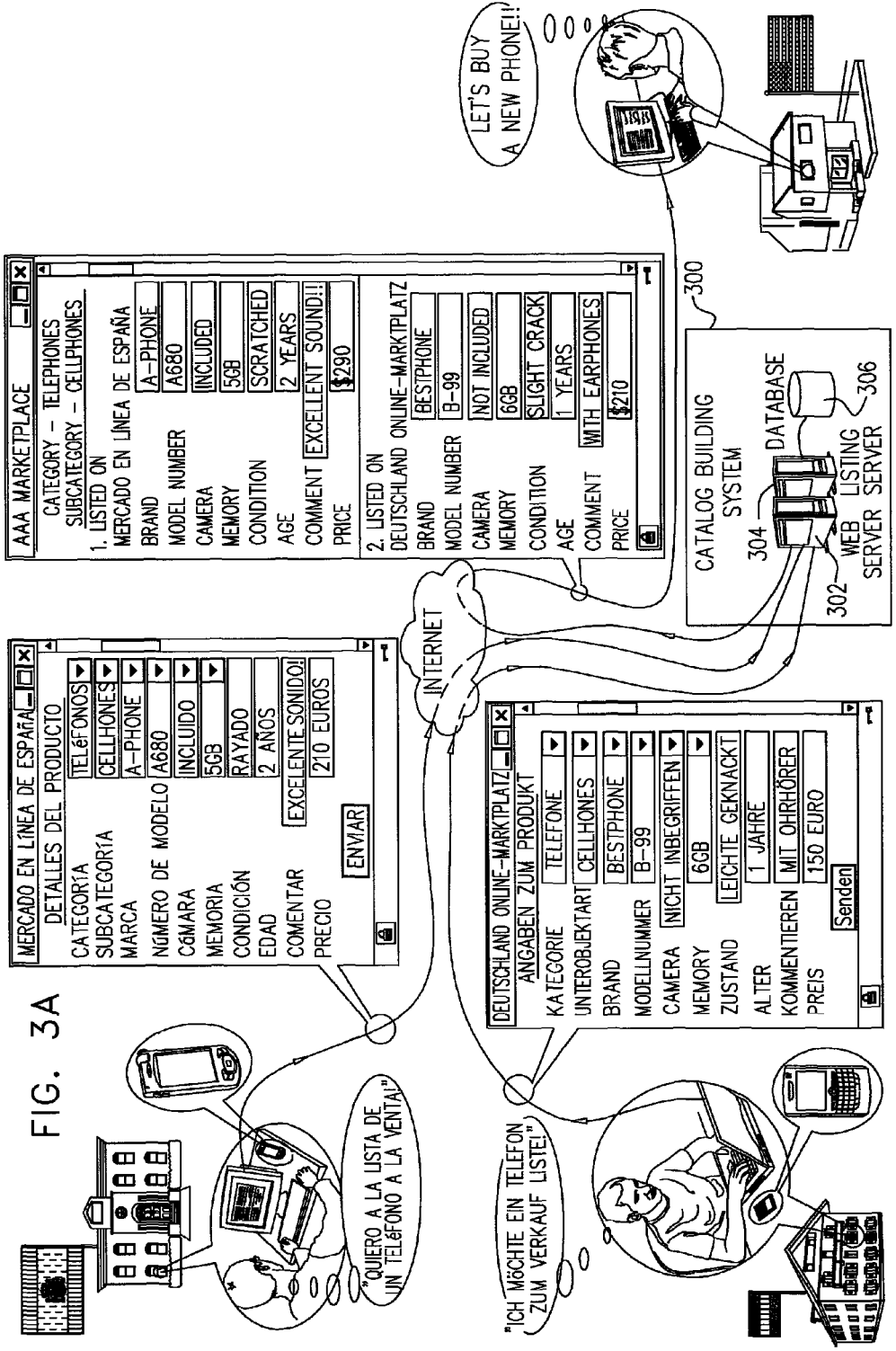

MULTI-LANGUAGE MULTI-PLATFORM E-COMMERCE MANAGEMENT SYSTEM

FIELD OF THE INVENTION

The present invention relates to computerized systems and methodologies for sales of products.

BACKGROUND OF THE INVENTION

The following patent publications are believed to represent the current state of the art:
U.S. Pat. Nos. 6,219,632; 6,349,275; 6,559,861; and 7,047,182.

SUMMARY OF THE INVENTION

The present invention seeks to provide improved computerized systems and methodologies for sales of products.

There is thus provided in accordance with a preferred embodiment of the present invention a computerized system for sale of products having non pre-catalogued parameters in a multi-lingual environment wherein a buyer and a seller communicate in different languages, the system including a non pre-catalogued parameter database, a listing engine operative to prompt in a first language a listing seller to enter multiple non pre-catalogued parameters relating to a product being listed and to store the non pre-catalogued parameters in the non pre-catalogued parameter database and a non pre-catalogued multiple language parameter description engine which is operative to provide human-readable descriptions of the non pre-catalogued parameters in at least one language other than the first language.

There is also provided in accordance with another preferred embodiment of the present invention a computerized system for sale of products having non pre-catalogued parameters, the system including a non pre-catalogued parameter database, a listing engine operative to prompt a listing seller to enter multiple non pre-catalogued parameters relating to a product being listed and to store the non pre-catalogued parameters in the non pre-catalogued parameter database and a non pre-catalogued multiple language parameter description engine which is operative to provide computer-generated human-readable descriptions of the non pre-catalogued parameters.

There is further provided in accordance with yet another preferred embodiment of the present invention a computerized system for integrating multiple e-commerce marketplaces operating in different languages including a language-independent product parameter database storing product parameters of a multiplicity of products offered for sale on multiple e-commerce marketplaces, each operating in a different one of multiple languages and a multiple language description engine which is operative to provide human-readable descriptions of the product parameters in the multiple languages.

Preferably, the language-independent product parameter database is a non pre-catalogued parameter database. Additionally, the system also includes a listing engine operative to prompt in a first language a listing seller to enter multiple non pre-catalogued parameters relating to a product being listed and to store the non pre-catalogued parameters in the non pre-catalogued parameter database and a non pre-catalogued multiple language parameter description engine which is operative to provide human-readable descriptions of the non pre-catalogued parameters in at least one language other than the first language.

There is even further provided in accordance with still another preferred embodiment of the present invention a computerized system for operating at least one e-commerce marketplaces in multiple different languages including a language-independent product parameter database storing product parameters of a multiplicity of products offered for sale by sellers who communicate in different ones of multiple languages and a multiple language description engine which is operative to provide human-readable descriptions of the product parameters in the multiple languages.

Preferably, the language-independent product parameter database is a non pre-catalogued parameter database. Additionally, the system also includes a listing engine operative to prompt in a first language a listing seller to enter multiple non pre-catalogued parameters relating to a product being listed and to store the non pre-catalogued parameters in the non pre-catalogued parameter database and a non pre-catalogued multiple language parameter description engine which is operative to provide human-readable descriptions of the non pre-catalogued parameters in at least one language other than the first language.

In accordance with a preferred embodiment of the present invention the system also includes an automatic real time sale responsive engine for responding to a sale of a product on one of the multiple e-commerce marketplaces to other e-commerce marketplaces. Additionally or alternatively, the system also includes an automatic real time product parameter change responsive engine for responding to a change in a product parameter on one of the multiple e-commerce marketplaces in other e-commerce marketplaces.

Preferably, the non pre-catalogued parameter database also stores pre-catalogued parameters.

In accordance with a preferred embodiment of the present invention the non pre-catalogued parameter database stores inherent non pre-catalogued parameters and non-inherent non pre-catalogued parameters.

There is still further provided in accordance with another preferred embodiment of the present invention a computerized system for sale of products in a multi-lingual environment wherein a buyer and a seller communicate in different languages, the system including a prompt-responsive parameter entry database, a translated free text phrase database, a listing engine operative to prompt in a first language a listing seller to enter multiple parameters relating to a product being listed and to store the parameters in the prompt-responsive parameter entry database and to accept parameter descriptive phases in free text, parameter descriptive phrase in free text translation functionality operative to translate the parameter descriptive phrases in free text from the first language into at least one other language and to store the translated free text phrases in the translated free text phrase database and a multiple language parameter description engine which is operative to provide human-readable descriptions of the both the prompt responsive parameters and the translated parameter descriptive phrases in at least one language other than the first language.

Preferably, the parameters include non pre-catalogued parameters.

There is also provided in accordance with yet another preferred embodiment of the present invention a computerized system for automated multi-lingual catalog building in a multi-lingual environment wherein a buyer and a seller may each communicate in a different language, the system including a parameter database, a first listing engine operative to prompt in a first language a listing seller to enter multiple parameters relating to a product being listed and to store the parameters in the parameter database, at least one second listing engine operative to prompt in at least one second language, different from the first language, a listing seller to enter multiple parameters relating to a product being listed and to store the parameters in the parameter database and a multiple language parameter description engine which is operative to provide human-readable descriptions of the parameters in at least one language other than the first language.

Preferably, the first and the at least one second listing engine are operative to accept parameter descriptive phases in free text and the system also includes a free text phrase database and parameter descriptive phrase in free text translation functionality operative to translate the parameter descriptive phrases in free text from into at least one other language and to store the translated free text phrases in the translated free text phrase database.

In accordance with a preferred embodiment of the present invention the multiple language parameter description engine is automatically operative to provide human-readable descriptions of the parameters in a language corresponding to the location of a potential buyer.

There is further provided in accordance with still another preferred embodiment of the present invention a computerized system for sale of products in a multi-lingual environment wherein a buyer and a seller communicate in different languages, the system including a translated free text phrase database and phrase in free text translation functionality operative to translate customer service request and response phrases in free text from a first language into at least one other language and to store the translated free text phrases in the translated free text phrase database.

There is yet further provided in accordance with another preferred embodiment of the present invention a computerized system for sale of products having non pre-catalogued parameters in a multi-lingual environment wherein a buyer and a seller communicate in different languages, the system including a question and/or answer parameter entry engine operative to prompt in a first language at least one of a buyer and a seller to enter multiple parameters relating to a product being listed and a question and/or answer generating engine which is operative to provide human-readable questions and/or answers based on the multiple parameters in at least one language other than the first language.

There is even further provided in accordance with still another preferred embodiment of the present invention a computerized system for sale of products, the system including a listing engine operative to prompt in a first language a listing seller to enter multiple parameters relating to a product being listed and to store the parameters in the prompt-responsive parameter entry database and a graphical indicator indicating to the listing seller in a visible manner the extent to which he has completed entry of the multiple parameters required for listing.

There is yet further provided in accordance with yet another preferred embodiment of the present invention a computerized system for sale of products in multiple currencies, the system including a listing engine operative to prompt a listing seller to enter an exchange rate threshold and an exchange rate threshold responsive engine automatically operative to vary pricing of a product or eliminate the listing in at least one currency in response to exceedance of the exchange rate threshold.

There is also provided in accordance with still another preferred embodiment of the present invention a computerized system for automated catalog building in a multiple e-commerce platform environment, the system including a parameter database; a first listing engine operative to prompt a listing seller to enter multiple parameters relating to a product being listed and to store the parameters in the parameter database and a parameter description engine which is operative to provide human-readable descriptions of the parameters in at least one language on multiple e-commerce platforms.

There is yet further provided in accordance with another preferred embodiment of the present invention a computerized system for automated catalog building, the system including a parameter database, a first listing engine operative to prompt a listing seller to enter multiple parameters relating to a product being listed and to store the parameters in the parameter database and a parameter description engine which is operative to provide human-readable descriptions of the parameters in at least one language.

BRIEF DESCRIPTION OF THE DRAWINGS

The present invention will be understood and appreciated more fully from the following detailed description, taken in conjunction with the drawings in which:

FIG. 2A is a simplified pictorial illustration of a preferred embodiment of a system and methodology for integrating multiple marketplaces, constructed and operative in accordance with another preferred embodiment of the present invention;

FIG. 3A is a simplified pictorial illustration of a preferred embodiment of a system and methodology for catalog building, constructed and operative in accordance with yet another preferred embodiment of the present invention.

DETAILED DESCRIPTION OF PREFERRED EMBODIMENTS

Figure 1A:
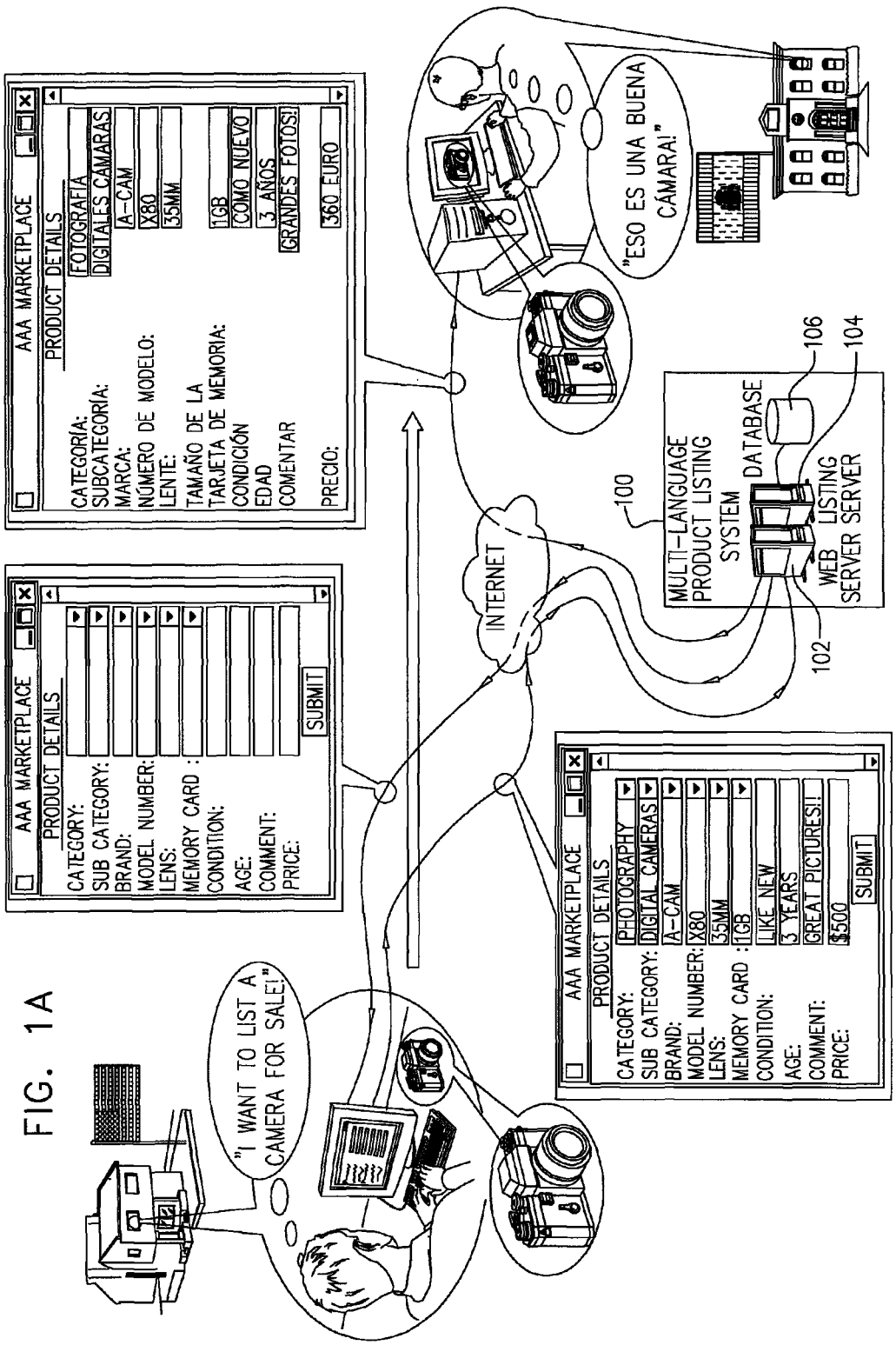
FIGS. 1A and 1B are together a simplified pictorial illustration of a preferred embodiment of a system and methodology for multiple language e-commerce, constructed and operative in accordance with a preferred embodiment of the present invention.
Figure 1B:
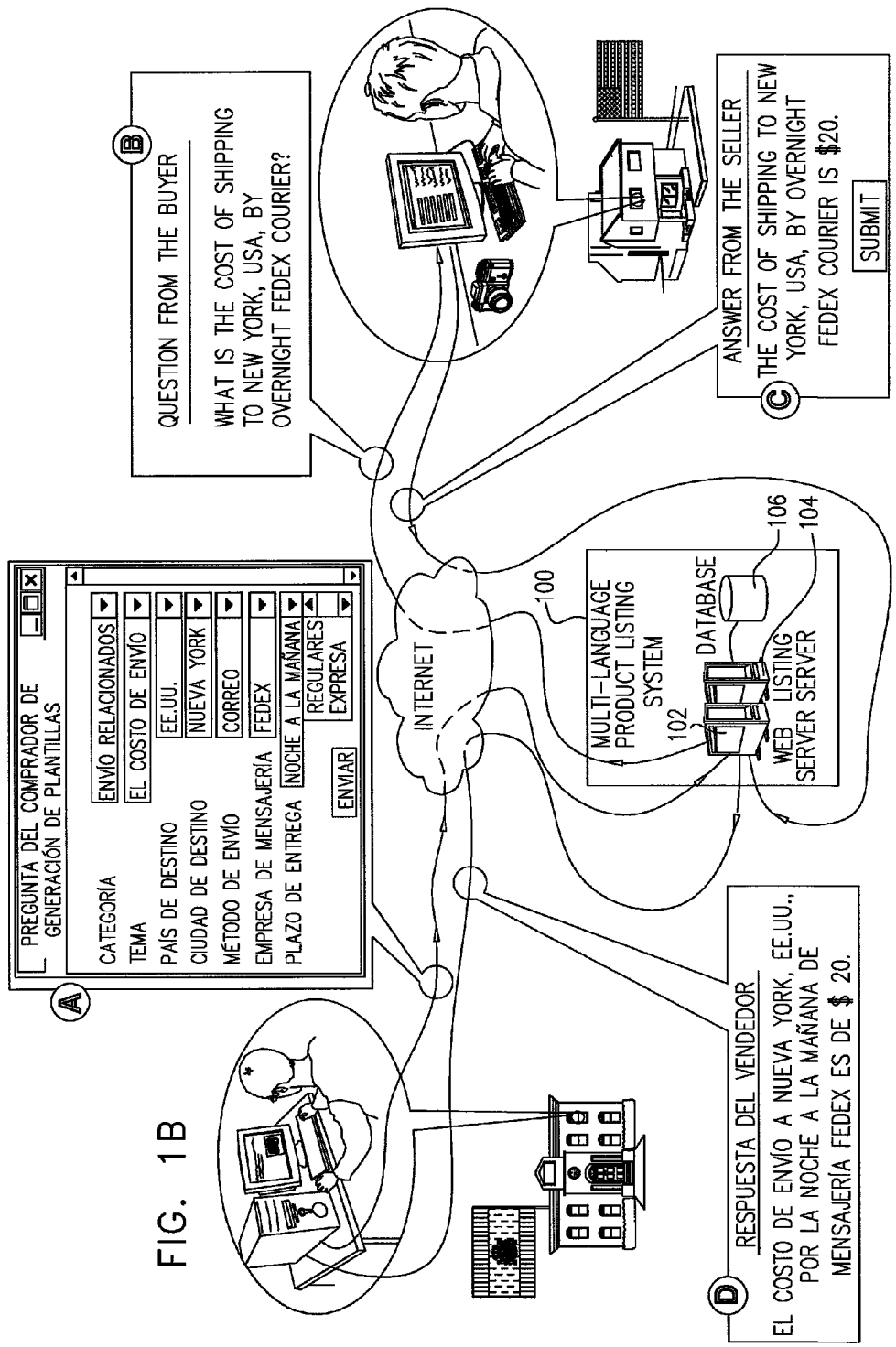
Figure 1C:
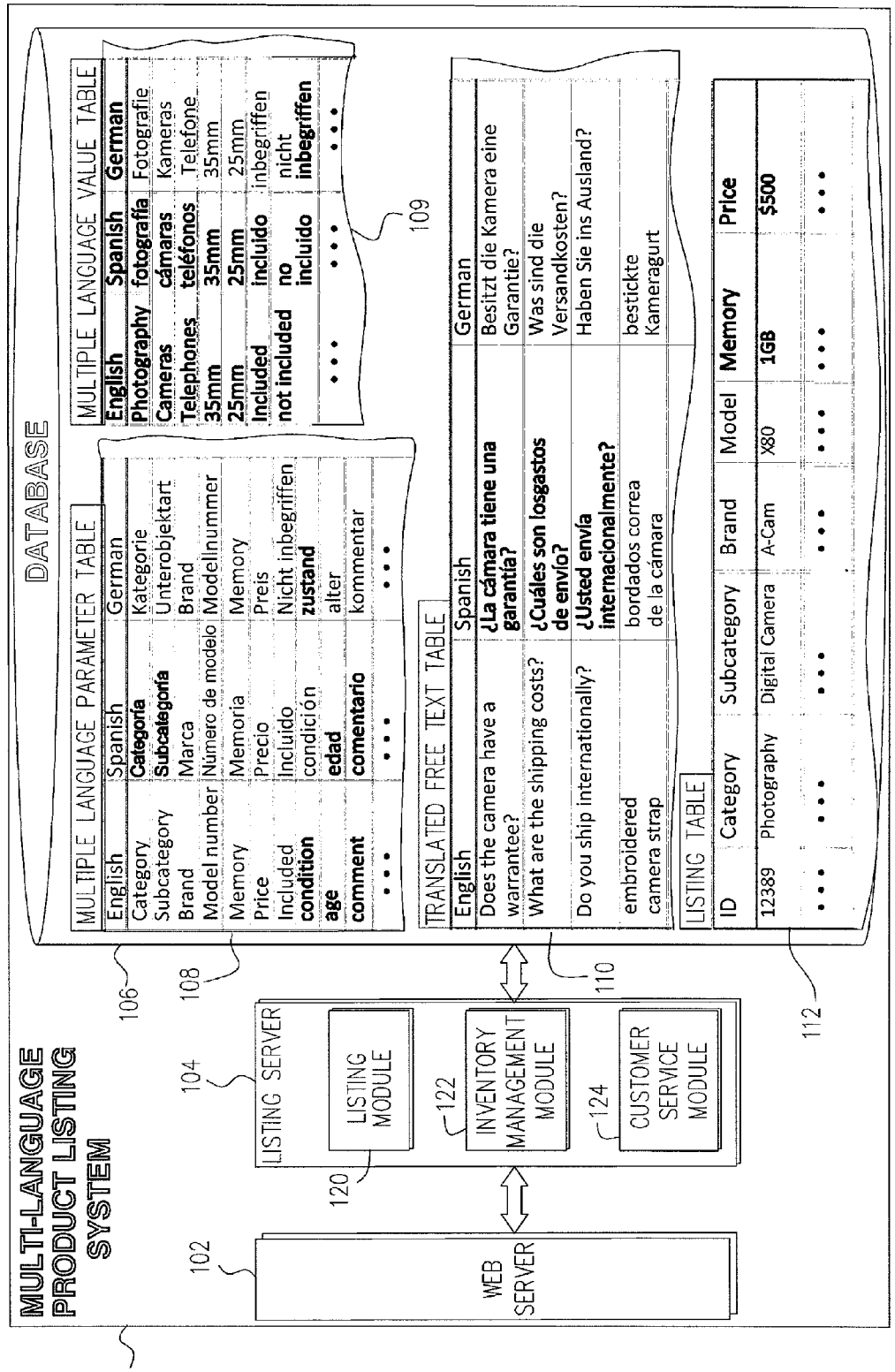
FIG. 1C is a simplified illustration of a database system useful in the embodiment of FIGS. 1A & 1B.

Reference is now made to FIGS. 1A and 1B, which are together a simplified pictorial illustration of a preferred embodiment of a system and methodology constructed and operative in accordance with a preferred embodiment of the present invention, and to FIG. 1C, which is a simplified illustration of a database system useful in the embodiment of FIGS. 1A & 1B.

As seen in FIGS. 1A and 1B, a listing party, such as an individual or an owner of a business which is not the owner or operator of an e-commerce website, wishing to list his camera for sale, is prompted to enter information regarding his camera. In accordance with a preferred embodiment of the present invention this information may include various inherent parameters, such as category, sub category, brand, model number, lens and memory card, as well as non-inherent parameters relating, for example, to the current condition of the product, for how many years it has been in use and the presence of scratches, dents or other defects. It is appreciated that the inherent parameters may include pre-catalogued parameters, which appear in existing catalogs and other databases and non pre-catalogued parameters, which must be entered by the listing party, since available catalog information is highly limited or non-existent. In the specific case of cameras, typical inherent parameters, which may or may not be pre-catalogued, include the following: digital or film, resolution level, zoom features, autofocus features and model year, which when combined create a catalog level specification.

The non-inherent parameters are by definition non pre-catalogued and must always be entered by the listing party.

The non pre-catalogued parameters are conventionally communicated in prior art e-commerce marketplaces by a listing party in free text. It is a particular feature of this embodiment of the present invention that many or all of such non pre-catalogued parameters are entered in response to specific prompts in a structured manner, as opposed to free text.

In accordance with a preferred embodiment of the present invention, the listing information supplied by the listing party is supplied to a multi-language product listing system 100 which preferably includes a web server 102, a listing server 104 and a database 106. Multi-language product listing system 100 preferably is constructed and operative as illustrated in FIG. 1C, described hereinbelow.

Multi-language product listing system 100 preferably provides both the pre-cataloged parameters, such as those of category, sub category brand, model number, lens and memory card, which are available in existing catalogs, as well as the non pre-catalogued parameters, which are not available in existing catalogs, including, inter alia, the non-inherent parameters relating, for example to the current condition of the product, for how many years it has been in use and the presence of scratches, dents or other defects, in multiple languages, so as to be accessible to persons who communicate in languages other than the language in which the product is listed. Such persons may be within the same country, geographical or political region or in a different country or region. Alternatively, the operation of the multi-language product listing system 100 is limited to non pre-catalogued parameters. It is appreciated that this information may be made available in a template format as shown in FIG. 1A, or in machine generated free text.

Although it is desirable to eliminate the need for free text in the listing information, a provision may be made for limited free text entry. Such free text may be translated manually or by machine. In accordance with a preferred embodiment of the present invention, such translations, when suitably validated as to correctness, may be stored in a translated free-text phrase table of database 106. It is noted that when the listing party enters numbers to indicate non-catalogued parameters, he may use free text input, since numbers do not require translation, even though units, such as inches and centimeters, require conversion.

Turning now to FIG. 1B, a further particular feature of the present invention is illustrated. A prospective buyer may wish to ask a question regarding the product, relating to information which was not included in the listing information. As seen in FIG. 1B, the prospective buyer may enter the question in his own language, here Spanish, preferably by using a buyer question generation template, indicated in FIG. 1B at A.

In accordance with a preferred embodiment of the invention, the question is rendered in machine generated free text in an appropriate language, here English. Alternatively a question may be generated in free text and translated manually or by machine. Such translation, when suitably validated as to correctness, may be stored in the translated free-text phrase table of database 106. In either case, the translated question is displayed to the listing party in the listing party's language.

The listing party may respond in his own language, as shown. The listing party may employ a buyer response generating template (not shown), which operates similarly to the buyer question generation template described above, or respond in free text. In the case of a free text response entry, the response is translated manually or by machine. Such translation, when suitably validated as to correctness, may be stored in the translated free-text phrase table of database 106.

Turning now to FIG. 1C, as noted above, multi-language product listing system 100 preferably includes web server 102, listing server 104 and database 106. Listing server 104 preferably communicates with web server 102 and preferably includes a listing module 120, which is operative to facilitate listing of products on system 100 by sellers, an inventory management module 122, operative to monitor the list of products listed on system 100, and a customer service module 124, operative to facilitate communication between buyers and sellers of products via system 100. Modules 120, 122 and 124 preferably store information and utilize information stored in database 106.

Database 106 preferably includes a multiple language parameter table 108 which provides both pre-cataloged parameters and non pre-cataloged parameters in multiple languages, so as to be accessible to persons who communicate in languages other than the language in which the product is listed. Such persons may be within the same country, geographical or political region or in a different country or region.

Database 106 preferably also includes a multiple language value table 109 which provides possible values of the pre-cataloged parameters in multiple languages, so as to be accessible to persons who communicate in languages other than the language in which the product is listed. A listing party, wishing to list a product for sale, may choose from a list of such possible values corresponding to any particular pre-catalogued parameter, as shown in FIG. 1A.

Database 106 preferably also includes a translated free-text phrase table 110 for providing translations of limited free text entries. As described hereinabove with regard to FIG. 1B, such free text may be translated manually or by machine. Additionally, database 106 preferably includes a listing table 112 which stores a list of products that have been listed by sellers using system 100, including relevant parameters of product information.

It is appreciated that by generating a listing using the present invention, new catalog data is synthesized for use by a future listing party using the listing data, whereby the next time a listing party wishes to list a similar item, the catalog data can be found in the catalog database. Such a synthesizing process can be automatic or can be controlled by the seller or by an operator of the system. This is indicated in FIGS. 1A-1C where it is shown that information in table 112 can be supplied to table 108.

Figure 2B:
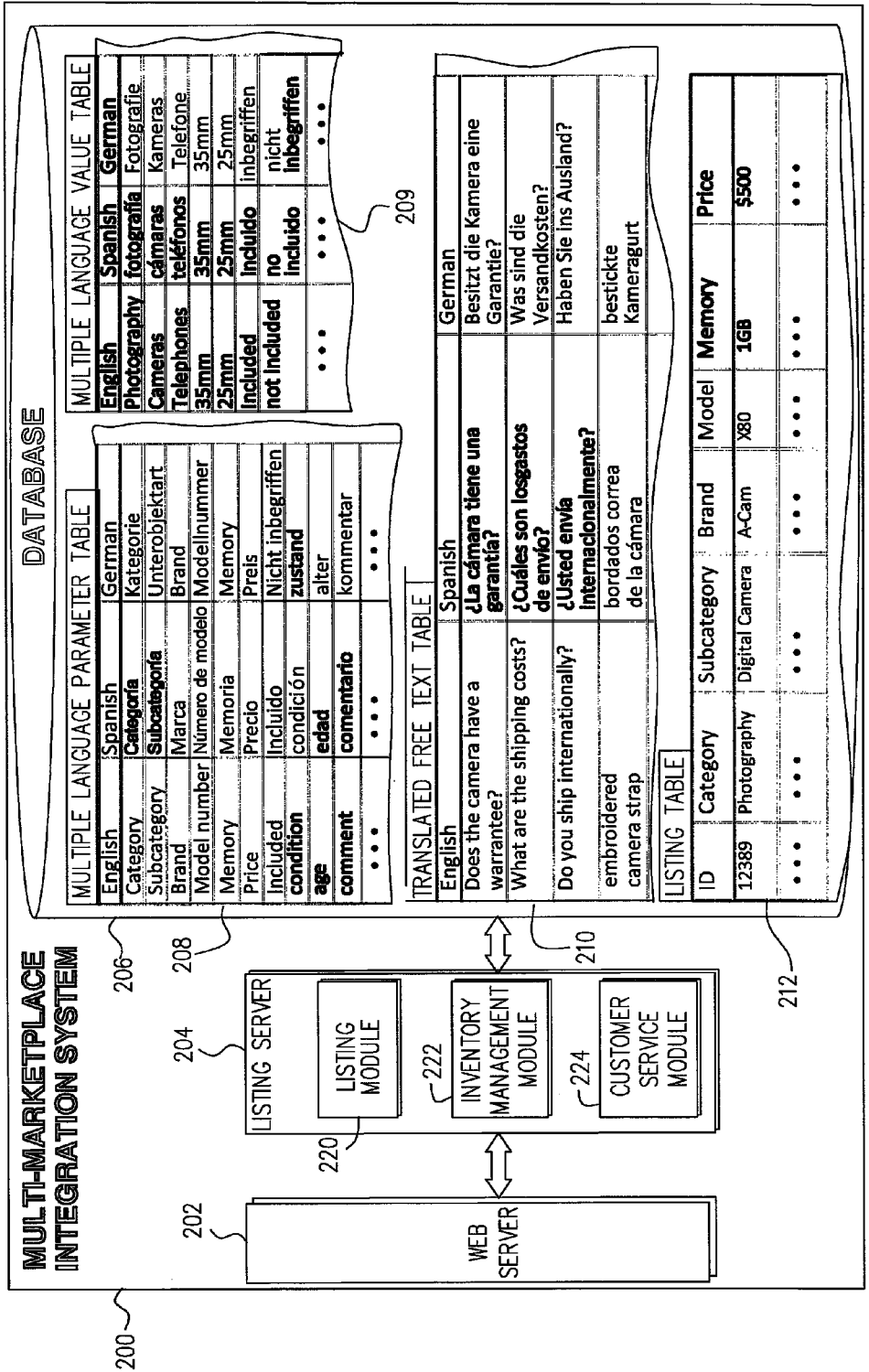
FIG. 2B is a simplified illustration of a database system useful in the embodiment of FIG. 2A.

Reference is now made to FIG. 2A, which is a simplified pictorial illustration of a preferred embodiment of a system and methodology constructed and operative in accordance with another preferred embodiment of the present invention, and to FIG. 2B, which is a simplified illustration of a database system useful in the embodiment of FIG. 2A. It is appreciated that this embodiment may be combined with the embodiment of FIGS. 1A-1C.

In this embodiment, a listing party, such as an individual or an owner of a business which is not the owner or operator of an e-commerce website, wishing to list his camera for sale, is prompted to enter information regarding his camera. As described above with reference to FIGS. 1A-1C, this information may include pre-catalogued parameters and non pre-catalogued parameters of the product.

In accordance with a preferred embodiment of the present invention, the listing information preferably supplied by the listing party is supplied to a multi-marketplace integration system 200 which preferably includes a web server 202, a listing server 204 and a database 206. Multi-marketplace integration system 200 preferably is constructed and operative as illustrated in FIG. 2B, described hereinbelow. It is appreciated that multi-language product listing system 100 and multi-marketplace integration system 200 may be integrated into a single system.

Multi-marketplace integration system 200 preferably provides the listed information, preferably including both the pre-cataloged parameters as well as non pre-catalogued parameters, to multiple marketplaces, such as e-commerce marketplaces, typically but not necessarily in multiple languages. Multi-marketplace integration system 200 preferably provides the information in the format characteristic of each marketplace. Thus, for example, it is seen in FIG. 2A that in the Mercado marketplace, the information is supplied in a template format while in the Marktplatz marketplace, it is provided in free text.

The pre-cataloged and non pre-catalogued parameters are preferably stored in a multiple language parameter table of database 206.

Although it is desirable to eliminate the need for free text in the listing information, a provision may be made for limited free text entry. Such free text may be translated manually or by machine. In accordance with a preferred embodiment of the present invention, such translations, when suitably validated as to correctness, may be stored in a translated free-text phrase table of database 206. It is noted that when the listing party enters numbers to indicate non-catalogued parameters, he may use free text input, since numbers do not require translation, even though units, such as inches and centimeters, require conversion.

Queries and responses between potential buyers and sellers may be handled as described hereinabove with reference to FIG. 1B.

It is a particular feature of the embodiment shown in FIGS. 2A & 2B, that, as shown, the multi-marketplace integration system 200 provides a real time or near real time indication of sale of the product on one of the multiple marketplaces and a corresponding real time or near real time notification of such sale on other ones of the multiple marketplaces, or withdrawal of the product from such marketplaces.

Turning now to FIG. 2B, as noted above, multi-language product listing system 200 preferably includes web server 202, listing server 204 and database 206. Listing server 204 preferably communicates with web server 202 and preferably includes a listing module 220 which is operative to facilitate listing of products on system 200 by sellers, an inventory management module 222 operative to monitor the list of products listed on system 200, and a customer service module 224 operative to facilitate communication between buyers and sellers of products via system 200. Modules 220, 222 and 224 preferably store information and utilize information stored in database 206.

Database 206 preferably includes a multiple language parameter table 208 which provides both pre-cataloged parameters and non pre-cataloged parameters in multiple languages, so as to be accessible to persons who communicate in languages other than the language in which the product is listed. Such persons may be within the same country, geographical or political region or in a different country or region.

Database 206 preferably also includes a multiple language value table 209 which provides possible values of the pre-cataloged parameters in multiple languages, so as to be accessible to persons who communicate in languages other than the language in which the product is listed. A listing party, wishing to list a product for sale, may choose from a list of such possible values corresponding to any particular pre-catalogued parameter, as shown in FIG. 2A.

Database 206 preferably also includes a translated free-text phrase table 210 for providing translations of limited free text entries. As described hereinabove with regard to FIG. 1B, such free text may be translated manually or by machine. Additionally, database 206 preferably includes a listing table 212 which stores a list of products that have been listed by sellers using system 200, including relevant parameters of product information, as well as status information relating to whether the product has been sold or is still available for sale.

Figure 3B:
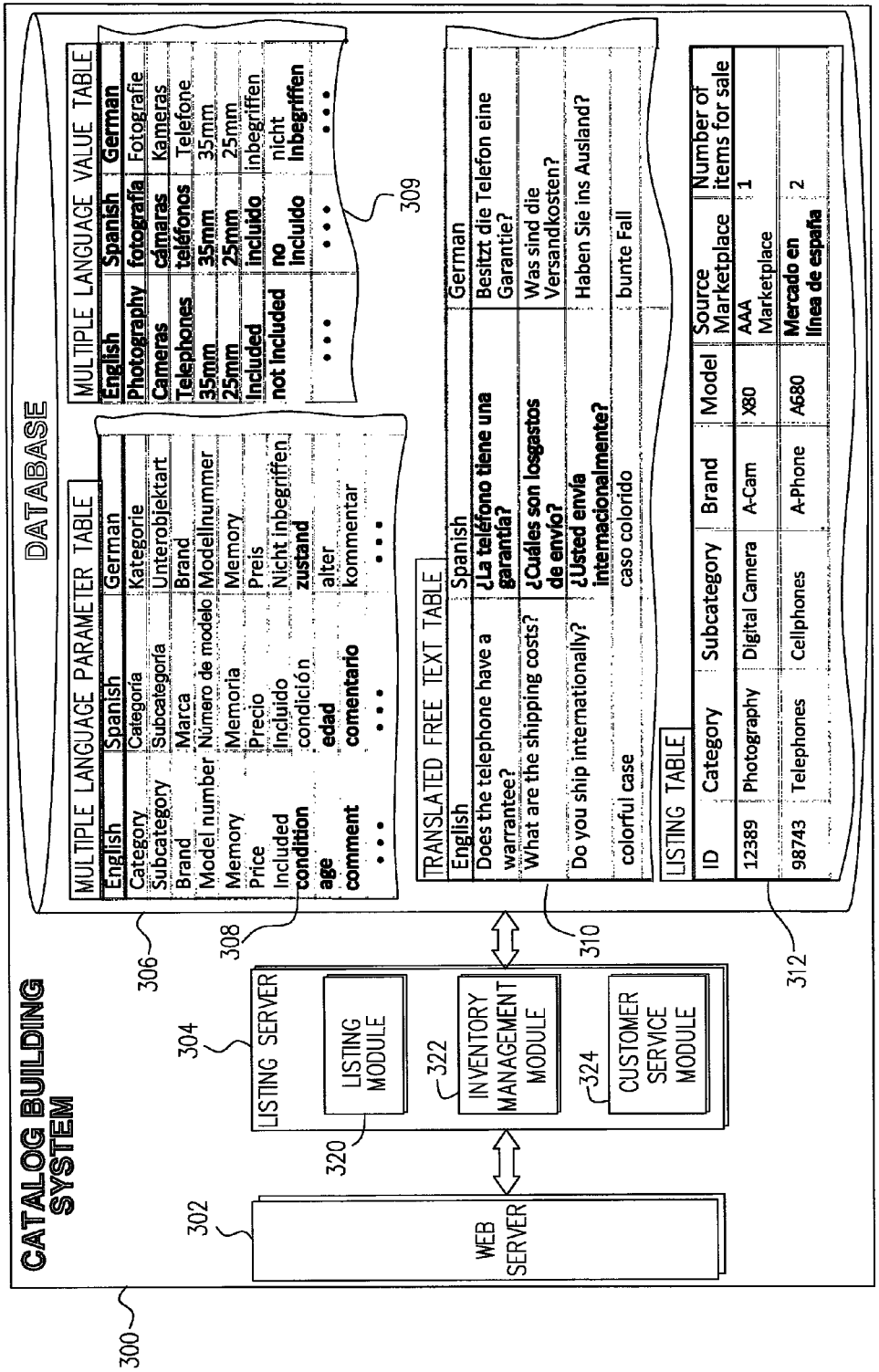
FIG. 3B is a simplified illustration of a database system useful in the embodiment of FIG. 3A.

Reference is now made to FIG. 3A, which is a simplified pictorial illustration of a preferred embodiment of a system and methodology for catalog building constructed and operative in accordance with yet another preferred embodiment of the present invention, and to FIG. 3B, which is a simplified illustration of a database system useful in the embodiment of FIG. 3A. It is appreciated that this embodiment may be combined with either or both of the embodiments of FIGS. 1A-1C and FIGS. 2A & 2B.

In this embodiment, listing parties, which may be owners or operators of e-commerce websites, or individuals or owners of businesses who do not own or operate an e-commerce website, wishing to list telephones for sale, are prompted to enter information regarding their telephones. As described above with reference to FIGS. 1A-1C, this information may include pre-catalogued parameters as well as non pre-catalogued parameters as described hereinabove.

In accordance with a preferred embodiment of the present invention, the listing information preferably supplied by the listing party is supplied to a catalog building system 300 which preferably includes a web server 302, a listing server 304 and a database 306. Catalog building system 300 preferably is constructed and operative as illustrated in FIG. 3B, described hereinbelow. It is appreciated that either or both of multi-language product listing system 100 and multi-marketplace integration system 200 may be integrated together with catalog building system 300 into a single system.

Catalog building system 300 preferably provides the listed parameters, preferably including both the cataloged parameters as well as non-catalogued parameters possibly in multiple formats to multiple marketplaces, such as e-commerce marketplaces, typically but not necessarily in multiple languages. The cataloged and non-catalogued parameters are preferably stored in a multiple language parameter table of database 306. It is appreciated that this information may be made available in a template format as shown in FIG. 3A, or in machine generated free text.

Although it is desirable to eliminate the need for free text in the listing information, a provision may be made for limited free text entry. Such free text may be translated manually or by machine. In accordance with a preferred embodiment of the present invention, such translations, when suitably validated as to correctness, may be stored in a translated free-text phrase table of database 306.

Queries and responses between potential buyers and sellers may be handled as described hereinabove with reference to FIG. 1B.

It is a particular feature of the embodiment shown in FIGS. 3A & 3B, that, as shown, the catalog building system 300 provides a potential buyer with multiple listings originating from multiple electronic marketplaces and thus integrates those marketplaces for the buyers and for the sellers.

Turning now to FIG. 3B, as noted above, multi-language product listing system 300 preferably includes web server 302, listing server 304 and database 306. Listing server 304 preferably communicates with web server 302 and preferably includes a listing module 320 which is operative to facilitate listing of products on system 300 by sellers, an inventory management module 322 operative to monitor the list of products listed on system 300, and a customer service module 324 operative to facilitate communication between buyers and sellers of products via system 300. Modules 320, 322 and 324 preferably store information and utilize information stored in database 306.

Database 306 preferably includes a multiple language parameter table 308 which provides both the catalogued parameters, such as category, sub category, brand, model number, lens and memory card, as well as non-catalogued parameters relating, for example, to the current condition of the product, for how many years it has been in use and the presence of scratches, dents or other defects in multiple languages, so as to be accessible to persons who communicate in languages other than the language in which the product is listed. Such persons may be within the same country, geographical or political region or in a different country or region.

Database 306 preferably also includes a multiple language value table 309 which provides possible values of the pre-cataloged parameters in multiple languages, so as to be accessible to persons who communicate in languages other than the language in which the product is listed. A listing party, wishing to list a product for sale, may choose from a list of such possible values corresponding to any particular pre-catalogued parameter, as shown in FIG. 3A.

Database 306 preferably also includes a translated free-text phrase table 310 for providing translations of limited free text entries. As described hereinabove with regard to FIG. 1B, such free text may be translated manually or by machine. Additionally, database 306 preferably includes a listing table 312 which stores a list of products that have been listed by sellers using system 300, including relevant parameters of product information, as well as information relating to available inventory of the product and to the source marketplace of the product.

It is appreciated that the various embodiments of the present invention are particularly suitable for use on mobile devices operated both by buyers and sellers. This is particularly true due to the various parameter entry templates which minimize the entry of free text.

It will be appreciated by persons skilled in the art that the present invention is not limited by what has been particularly shown and described hereinabove. Rather, the scope of the invention includes both combinations and subcombinations of various features described hereinabove as well as modifications and variations thereof which would occur to persons skilled in the art upon reading the foregoing and which are not in the prior art.

The invention claimed is:

1. A computerized system for sale of non pre-catalogued products having non pre-catalogued parameters in a multi-lingual environment wherein a buyer and a seller each communicate in a different language, the system comprising:
   a non pre-catalogued product database including:
      a multiple language product parameter table including selectable pre-translated parameters; and
      a multiple language product parameter value table including selectable pre-translated values corresponding to said pre-translated parameters, said multiple language value table being displayed together with said multiple language parameter table;
   at least one server computer connected to said non pre-catalogued product database, said at least one server including:
      a non pre-catalogued product listing engine configured to prompt, in a first language, a listing seller to select in a structured manner at least one of said parameters appearing in said first language relating to a product to be listed and to select at least one of said values appearing in said first language and corresponding to said selected parameters and to store selected ones of said parameters and selected ones of said values corresponding to said selected parameters in said non pre-catalogued product database to create a listed product in said first language; and
      a non pre-catalogued multiple language product description engine configured to provide for each said listed product, human-readable descriptions of said selected pre-translated, non pre-catalogued parameters and corresponding selected pre-translated, non pre-catalogued values in at least one language different from said first language, said human readable descriptions corresponding to selections of said non pre-catalogued parameters and values made by said listing seller using said first language; and
   a display providing to a customer, different from the listing seller, said human readable descriptions of said listed product in said at least one language different from said first language in response to a customer query.

2. A computerized system for sale of non pre-catalogued products according to claim 1 and wherein said at least one server also includes:
   a question and/or answer parameter entry engine configured to prompt, in a first language, at least one of a buyer and a seller to enter multiple parameters relating to a product being listed; and a question and/or answer generating engine which is operative to provide human-readable questions and/or answers based on said multiple parameters in at least one language other than said first language.

3. A computerized system for sale of non pre-catalogued products according to claim 1 and wherein said listing engine is configured to prompt, in a first language, said listing seller to select multiple parameters relating to said product to be listed and the system also comprises a graphical indicator indicating to the listing seller in a visible manner the extent to which he has completed entry of the multiple parameters required for listing.

* * * * *